United States Patent [19]
Mendelson

[11] 3,873,235
[45] Mar. 25, 1975

[54] VARIABLE PITCH TURBOFAN ENGINE

[75] Inventor: Irwin Mendelson, Cincinnati, Ohio

[73] Assignee: General Electric Company, Cincinnati, Ohio

[22] Filed: Oct. 1, 1973

[21] Appl. No.: 402,067

[52] U.S. Cl.................. 416/154, 416/157, 416/61
[51] Int. Cl.... B64c 11/06, B64c 11/30, B64c 11/38
[58] Field of Search............ 416/46, 153, 154, 157, 416/61; 91/416

[56] References Cited
UNITED STATES PATENTS

| | | | |
|---|---|---|---|
| 2,472,693 | 6/1949 | Brown | 416/61 |
| 2,670,805 | 3/1954 | Nichols | 416/61 |
| 2,993,543 | 7/1961 | Allen | 416/157 |
| 3,439,745 | 4/1969 | Gaubis | 416/154 |
| 3,487,880 | 1/1970 | Davies et al. | 416/157 |
| 3,621,757 | 11/1971 | Bottoms | 91/416 |
| 3,757,640 | 9/1973 | Karol | 91/416 |

*Primary Examiner*—Everette A. Powell, Jr.
*Assistant Examiner*—Louis T. Casaregola
*Attorney, Agent, or Firm*—Derek P. Lawrence; Lee H. Sachs

[57] ABSTRACT

A turbofan engine is provided with an actuator for varying the fan pitch angle by rotating individual fan blades within apertures in an associated fan disc. The actuator includes a shaft, a sleeve circumscribing the shaft, and a casing receiving both the shaft and the sleeve. Means between the casing and the blade shank rotate the blade (to change its pitch) in response to relative rotation between the casing and the shaft. In order to lock the fan blades in selected pitches between pitch changes, a pitch lock is provided which utilizes a locking piston and a thrust collar cooperating respectively with the casing and the shaft and incorporating interlocking releasable teeth. The locking piston is biased by spring means into a locking relationship with the thrust collar so that if pressure is lost in a main actuating cylinder (within which both the locking piston and an actuator piston are disposed), a fail-safe pitch locked status is assumed by the fan. In order to sense the pitch angle, means are provided for reading the axial position of the actuator piston and, hence, the pitch angle of the fan at any given instant.

13 Claims, 5 Drawing Figures

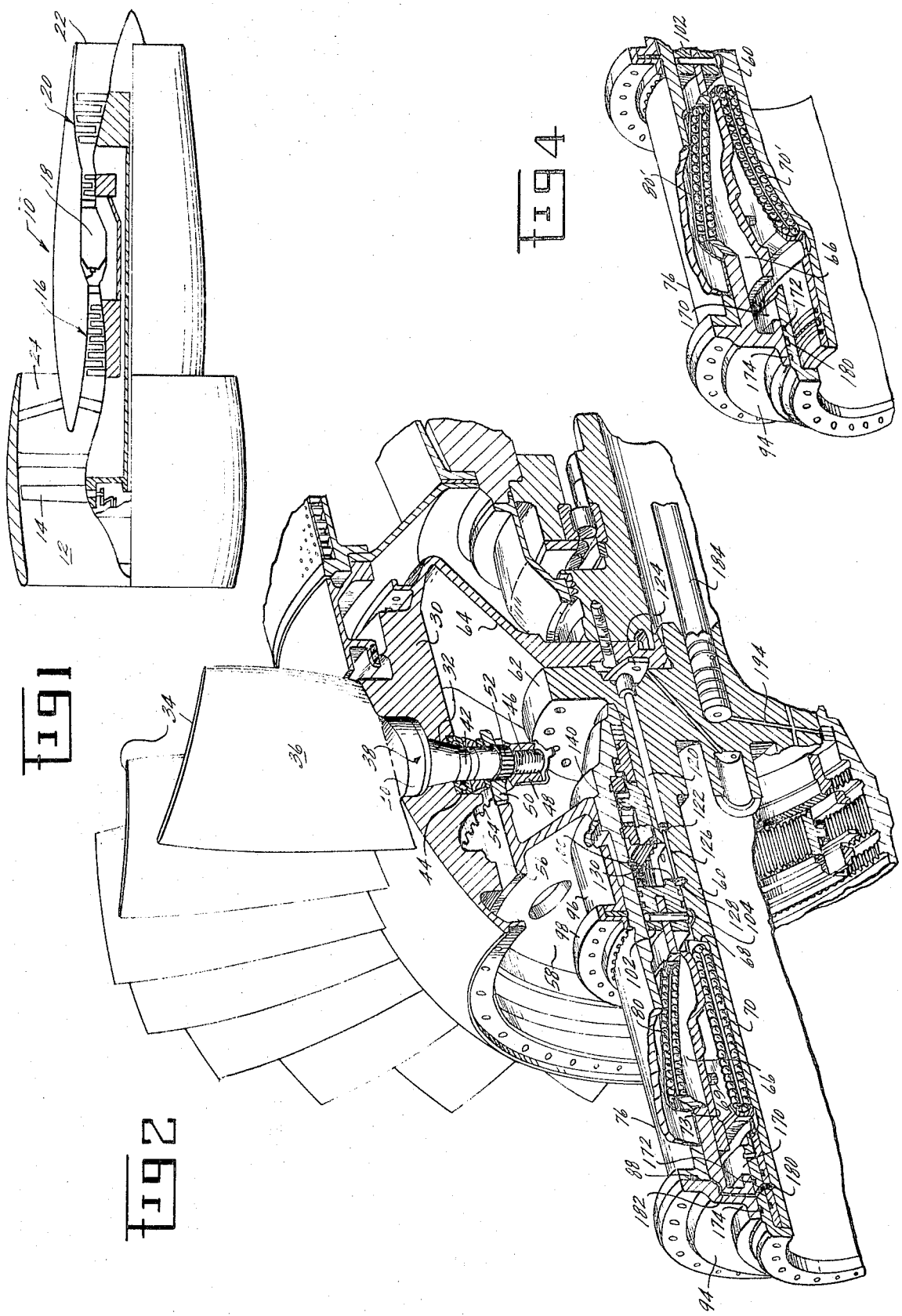

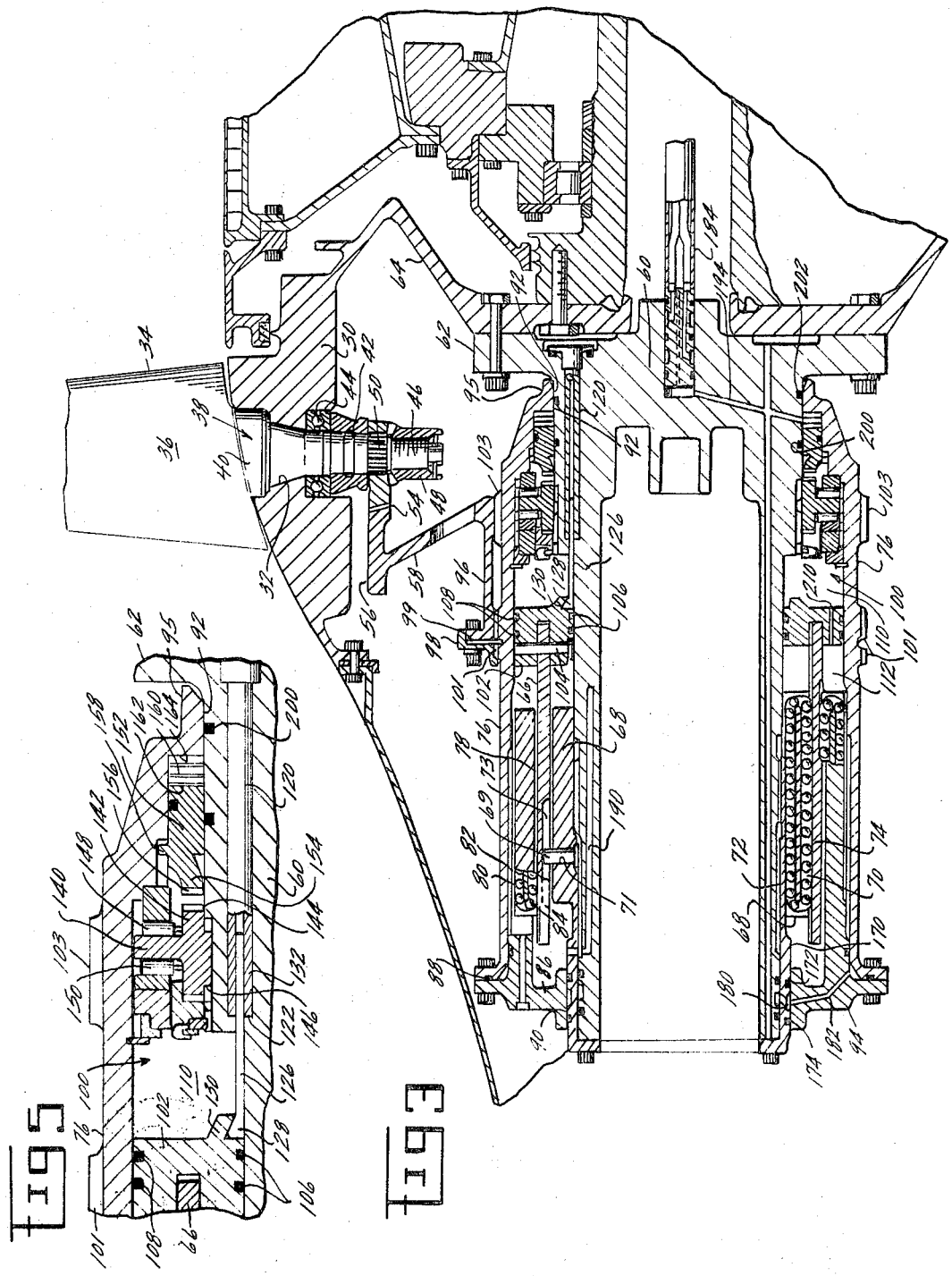

VARIABLE PITCH TURBOFAN ENGINE

BACKGROUND OF THE INVENTION

The present invention pertains to turbofan engines and, more particularly, to the actuation of the pitch changing mechanism of a variable pitch variety thereof. The invention herein described was made in the course of or under a contract, or a subcontract thereunder, with the United States Department of the Air Force.

Recent aircraft engine developments have proceeded in the direction of high bypass turbofan engines, which offer improved fuel consumption and efficient operation while operating in the mode of common commercial air transport vehicles. As another benefit, these high bypass turbofan engines provide increased thrust capabilities with lower emissions of jet noise than equivalent turbojet engines.

In order to further enhance the efficient operation of such engines, it has been found advantageous to incorporate a variable pitch characteristic whereby the blades of the fan might be varied in pitch and thus meet the incoming air at different angles of attack. It has been found that optimum pitch angles exist for a given application corresponding to each rotational velocity of the fan disc.

As an added benefit, it has been found that appropriately variable pitch fan blades can be used in place of the thrust reversers common to present day engines for providing added braking power utilized to shorten landing distance requirements.

Still another advantage of variable pitch fans is that they permit increased flexibility in the operation of that variety of very recent engines known generally as variable cycle engines. By permitting a variation of the quantity of air drawn through the fan blades at any given fan rotational velocity, the variable pitch fan permits increased or decreased quantities of air to be ducted around the associated core engine, or pass therethrough, for the purpose of increasing or decreasing the bypass ratio of the engine. In general, then, it is highly desirable to develop a mechanism for efficiently actuating a pitch varying characteristic.

As a side consideration, it is also important to provide means by which the pitch may be sensed so that appropriate reaction thereto might be taken either by the pilot or by a preselected control system. Furthermore, should a loss of pitch varying power occur, it is essential that the fan be fail-safe in its pitch varying mechanism in order to avoid possible engine damage.

BRIEF SUMMARY OF THE INVENTION

It is therefore a primary objective of the present invention to provide a variable pitch turbofan engine having an efficient and simple pitch varying actuating system incorporating a pitch sensing device as well as a fail-safe mechanism for locking the pitch. To enhance reliability of the apparatus, it is another objective of this invention to provide unique leak-proof redundant seal systems for hydraulics associated with the actuator. A further advance represented by this invention provides for temperature equalization with the hydraulic system to enhance system accuracy.

In order to accomplish these as well as other objectives which will become apparent hereinafter, the present invention provides a variable pitch fan actuator, including a shaft cooperating with the fan disc and rotatable therewith, a sleeve telescopically receiving the shaft and axially translatable with respect thereto, a casing telescopically receiving the sleeve and shaft and rotatable with respect to the shaft, means for turning the fan blades with respect to the disc in response to rotation of the casing relative to the shaft, and recirculating ball splines disposed between the shaft and sleeve and between the sleeve and the casing, the splines having different helix angles to accomplish casing rotation in response to sleeve translation.

The sleeve cooperates with a piston and cylinder arrangement for providing sleeve translation to accomplish the pitch change action. A pitch position sensor is incorporated which determines the pitch by reading the position of the piston within the cylinder and hence of the casing with respect to the shaft. The present invention further provides a pitch lock which secures the fan blades in a given pitch position between operations of the pitch change mechanism. The pitch lock includes a locking piston disposed within the same cylinder as the actuator piston and actuated by pressure within the cylinder which likewise operates the actuator piston.

In order to accomplish the various activities in a reliable fashion, a redundant sealing system is provided for the hydraulic elements of the invention wherein primary and secondary seals are spaced apart and a drain line disposed therebetween for draining fluid, which may leak past the primary seal, to a sump. In order to achieve accurate operation under conditions of radical temperature changes, as frequently are encountered by aircraft engines, a temperature equalizing bleed orifice is provided for transferring actuator fluid across the actuator piston to equalize temperatures at either side of the piston within the cylinder.

BRIEF DESCRIPTION OF THE DRAWINGS

The invention will be more clearly understood upon reading the following description taken with the appended drawings, wherein:

FIG. 1 is a simplified cross-sectional view of a typical high bypass turbofan engine having variable pitch fan characteristics;

FIG. 2 is a cross-sectional perspective view of the fan section of the engine of FIG. 1 illustrating the present invention;

FIG. 3 is an enlarged cross-sectional view of a portion of the fan mechanism;

FIG. 4 is a variation of a portion of the fan mechanism of FIG. 2; and

FIG. 5 is an enlarged cross-sectional view of a further portion of the fan mechanism of FIG. 2.

DETAILED DESCRIPTION OF A PREFERRED EMBODIMENT

Variable Pitch Actuator

In FIG. 1, a simplified gas turbine engine indicated at 10 includes an annular duct 12, a bladed fan 14, a compressor 16, a combustion chamber 18, and a turbine 20 along with an exhaust nozzle 22. This engine operates in a fashion similar to typical engines of this variety. Atmospheric air enters inlet 12 from the left in FIG. 1 to be compressed by fan 14 and compressor 16, a portion of the flow passing through a fan duct 24 and the remainder through the compressor 16 and into the combustor 18. Within the combustor, the air is mixed with fuel and ignited, whereupon rapid expansion of the fuel occurs and a high velocity stream of products of combustion exits the combustor to the right and engages the rotatable bladed stages of turbine 20 to impart torque thereto for the operation of the fan 14 and compressor 16. The gas stream exiting the turbine 20 is combined with the fan stream within duct 24 and expelled through the exhaust nozzle 22 to provide a substantial thrust toward the left in the FIGURE.

As has been stated above, it has become desirable to permit the variation of the pitch of the fan blades 14 with respect to the incoming air flow; in other words, for the fan blades to be pivoted about a radial axis for the purpose of changing the angle at which the fan blade meets the incoming air. The present invention accomplishes this pitch variation in a uniquely efficient and simplified fashion and, in addition, provides several useful mechanisms to complement this action.

Referring to FIG. 2, a variable pitch turbofan engine is depicted which incorporates elements of the present invention. The elements depicted in this view are generally similar in function to those in FIG. 1, but are shown in greater detail; and different reference numerals are utilized. A fan disc 30 having a generally circular periphery and being rotatable about its longitudinal axis is provided with a plurality of apertures in its periphery, a typical aperture designated 32. The apertures are generally circular in the cross section and are of stepped diameter to incorporate shoulders capable of receiving abutting members. In addition, the disc tapers at its forward end (the left end in the FIGURE) in a fashion appropriate for mating with a conical bullet nose, not shown. The disc, thus described, is suitable for disposition within the inlet to a turbofan engine similar to that depicted in FIG. 1.

Emanating from the disc 30 are a plurality of fan blades 34. Each of the fan blades incorporates an airfoil 36 with a shank 38 adapted to penetrate one of the apertures 32 in the disc. The shank includes an enlarged generally circular portion 40 and a smaller tapered generally conical portion 42 adapted to be rotatable within an aperture 32 and to be supported by means of the diameter steps therein. In order to enhance this rotatable character, a bearing 44 is provided between the shank and the aperture to permit relative rotation therebetween. The innermost end of the shank includes a thread 46 which joins with a mating threaded sleeve member 48, which receives the shank and retains it in a predetermined radial position with respect to the disc.

In order to accomplish pivoting of the blade shank 38 and thus of the airfoil 36, with respect to the disc, a gear or gear sector 50 is disposed about the shank and cooperates with the shank by means of a mating spline 52. Each such blade has its own spline and sector gear for individual control of its own rotation. In order to accomplish rotation of the blades, a large annular master synchronizing pinion 54 is provided which interlocks and meshes with each sector gear. The pinion faces axially rearwardly and engages the axially forward facing sector gears. The pinion is formed integrally with and is carried by a large annular rotatable flange 56 which, in turn, cooperates with a generally conical, generally radially extending support member 58 which is also formed integrally with the flange. The support member 58 comprises a conical continuous ring extending about internal portions of the pitch change actuating mechanism and interconnected therewith, as will be described.

According to one major objective of the present invention, there is provided a simplified, reliable and highly efficient mechanism for accomplishing pitch change of the fan blades through rotation of the master synchronizing pinion 54 introduced hereinabove. The torque required to rotate each of the blades, in a typical rotor, increases with tip speed as well as physcial size. The total actuation torque for the bladed rotor equals the summation of torques required for each blade multiplied by a gear ratio. This gear ratio may be tyically defined as the pitch diameter of the master synchronizing pinion divided by the blade gear pitch diameter. Due to geometric and other functional considerations, the gear ratio is normally greater than unity and typically greater than four to one. In addition, the tip speeds and physical size of the blade associated with variable pitch fans are large. Hence, a very large torque is required from the actuator mechanism to accomplish pitch change. Thus, the high efficiency operation provided by the present invention is essential to the practicality of a variable pitch fan mechanism. Elements of this actuating system are introduced and described hereinafter.

Very briefly, these elements include a shaft affixed to the disc, introduced above, a sleeve circumscribing the shaft and movable with respect thereto, and a casing circumscribing the sleeve and shaft and affixed to the support member 58 in order that rotation of the casing might rotate the synchronizing pinion and thus accomplish pitch change.

More particularly, and referring to FIGS. 2 and 3, shaft 60 can be seen to cooperate with the disc 30 by means of a bolted relationship of a flange 62 of the shaft with a flange 64 depending from the disc. As a result, the shaft is fixed and cannot move relative to the disc 30, although both are rotatable about the centerline of the engine. Thus, the shaft is secured in a predetermined axial and circumferential relationship with the disc.

Disposed to the radial exterior of and circumscribing the shaft 60 is a sleeve 66 which receives the shaft telescopically in a loose cooperating relationship. The sleeve is generally annular in the cross section and conforms with the cross-sectional shape of the shaft. As a result, but for elements to be described, the sleeve would be freely rotatable at the shaft and also freely translatable axially with respect thereto.

Disposed between the shaft 60 and sleeve 66 is a housing 68 which supports a number of recirculating ball spline members, a typical one of which is shown and designated 70. The ball spline member 70 is provided in a generally helical disposition about the inner surface of the sleeve 66 and the outer surface of the shaft 60. The balls recirculate within grooves 72 and 74 carried by the shaft and sleeve, respectively. In the case of ball spline 70, the helix angle, that is, the angle at which the ball spline is disposed relative to the surface of the mating members, is zero, with the result that this ball spline is essentially linear in the direction of the axis of the engine. In consequence to the disposition of the ball spline between the shaft and sleeve, and the linear orientation of the ball spline, rotation of the sleeve about the shaft is inhibited while axial relative translation therebetween is facilitated. The number of ball spline arrangements disposed about the shaft depends upon the loading conditions in each case necessary to permit the fully loaded device to translate as described.

To further guide the motion of sleeve 66, a pin 69 is impaled through an aperture 71 in housing 68 and rides within a linear groove 73 in sleeve 66. As the sleeve reciprocates, it is kept within a non-rotating motion by this pin and groove, in addition to the ball spline action.

To the radial exterior of the sleeve, and dimensioned to receive the sleeve telescopically in a loose relationship, is disposed a casing 76 which, but for a second set of ball splines, to be described, would be freely rotatable and translatable with respect to the sleeve and hence the shaft. An annular housing 78 incorporates the second set of ball splines, typically spline 80, which cooperate with and recirculate through grooves 82 and 84 in the casing inner surface and sleeve outer surface, respectively. Ball spline 80 is provided with a second predetermined helix angle which is other than zero in this instance so that, in the prespective view of FIG. 2, this ball spline has a screw thread appearance as opposed to the linear appearance of spline 70. By means of a bolted relationship between the casing 76 and a forward flange 86, at the bolt interface designated 88, the casing is axially fixed with respect to the shaft 60 but, by means of appropriate bearing elements, is freely rotatable thereabout. Two generally cylindrical junctions 90 and 92 are depicted between the exterior of the shaft 60 and frictionally engaging shoulders 94 and 95, respectively, of the casing 76.

An axially extending flange 96 is formed integrally with the conical member 58 which supports the master synchronizing pinion 54, and this flange interconnects by means of a bolted relationship at 98 with an upstanding shoulder 99 which circumscribes the casing 76. The should 99 cooperates in a splined relationship 101 with a mating spline on the exterior of the casing. Additionally, a similar spline relationship 103 exists aft at the acute angular bend between conical member 58 and the flange 96. By means of this interrelationship of elements, rotation of the casing 76 about the shaft 60 results in rotation of the pinion 54 with respect to the disc and hence in imparting of torque by the pinion 54 to each of the individual sector gears 50. This ultimately results in pitch change of the blades 34.

The rotation of the casing 76 with respect to the shaft 60, and hence, with respect to the disc 30, is accomplished by interaction between the recirculating ball splines 70 and 80 and associated elements during translation of the sleeve 66 in the axial direction. This can be appreciated upon remembering that the splines 70 and 80 are provided with different helix angles, and that the motion of the sleeve is determined by the helix angle of spline 70 while the motion of the casing is determined by the helix angle of spline 80. In the present embodiment, the sleeve translates axially with no rotation while the casing does not translate, but rotates due to the non-zero helix angle of spline 80. This same motion can be attained through using splines having other helix angles; however, for the sake of simplicity, a zero helix angle has been used here.

In the present embodiment, actuation of the pitch change mechanism is initiated by imparting translation to the sleeve 66. This translation occurs in response to a predetermined signal, in this first embodiment to an imposition of a pressure differential across a piston within a cylinder. More particularly, a portion of the annular gap defined between the casing 76 and the shaft 60 comprises a hydraulic cylinder 100 within which is disposed an annular actuating piston 102 which is a generally continuous ring and surrounds the shaft 60. The actuating piston 102 cooperates with sleeve 66 by means of a fixed junction between the piston, the sleeve and a plurality of radial pins 104. In order to enhance the operation of the piston, a plurality of piston rings 106 are provided for sealing the area between the piston and the shaft, and similar rings 108 are provided for sealing the area between the piston and the casing 76. In addition, a plurality of highly effective seals are provided for sealing the cylinder against leakage, these seals to be described hereinafter.

It can thus be appreciated that, upon the application of a pressure differential within the cylinder across the piston, the piston will progress in the direction of the lower pressure, in the fashion of typical piston and cylinder arrangements.

With respect to this embodiment of the present invention, the imposition of a higher pressure within the cylinder toward the aft side 110 of the piston than within the upstream side 112 thereof, will create a pressure differential which will cause forward translation of the piston and sleeve leading to counterclockwise rotation of casing 76 in FIG. 2 resulting in closing of the pitch of the blades 34.

The amount of pitch change per unit piston travel depends upon the helix angle of splines 70 and 80. FIG. 4 depicts an alternative spline arrangement wherein inner spline 70' has a helix angle other than zero, as does spline 80'. In FIG. 4, the helix angles are of opposite sense, with the result that unit piston travel will cause reduced pitch change due to reduced rotation of casing 76. This arrangement could be utilized where less pitch change but greater torque for accomplishing pitch change are required. On the other hand, the helix angles of similar sense can be used to increase pitch change per unit piston travel.

In the embodiment of FIGS. 2 and 3, the cylinder 100 is defined between the shaft 60 and the casing 76 and thus, is secured with respect to the shaft 60 and disc 30. This, however, need not be the case, for even a cylinder which rotates with the casing will permit the sleeve to translate in response to an appropriate pressure differential. In fact, the cylinder might be deleted from its position in this embodiment and placed in a position isolated from the remaining actuation elements (or might be removed altogether and replaced by some mechanical or electrical mechanism for accomplishing sleeve translation). Similarly, the actuating piston 102 can be positioned in any convenient fashion or could even be removed and replaced by some other element to cause sleeve 66 to translate axially. (Along this same vein, it would be apparent to those skilled in the art that, it is not essential that the casing 76 rotate relative to the shaft but some other relative motion therebetween can be used in an adapted form to rotate the blades 34 in their apertures 32. For Example, proper pinion and gear placement would permit translation of the casing 76 to rotate the blades and thus change pitch. Other such variations will be apparent to those skilled in the art.)

In operation, the pitch change actuator of the current embodiment of the present invention will function as follows. The pressure to one side of the actuator piston 106, either the aft side 110 or the fore side 112 will be raised by means not shown but typical to the art. The piston will translate in response to this change and carry with it the sleeve 66 in linear motion to which it is restrained by spline 70 and pin 69.

In reponse to this action, the second ball spline 80, disposed with a helix angle other than zero in the current embodiment, will cause rotation of the casing 76 about the sleeve and hence about the shaft 60; but the casing will not translate with respect to the shaft due to the bolted junction 88. As the casting rotates, it carries the support member 58 along in its rotation by means of the bolted junction between shoulder 94 and flange 96, as well as due to the splined junctions 101 and 103 between these elements. As a result thereof, the master synchronizing pinion 54 will be rotated as an integral unit with the conical support member 58. This rotation will be relative rotation with respect to the disc 30 which is secured to the shaft and thus immovable with respect thereto.

Such rotation between the pinion 54 and disc 30 results in relative motion between the teeth of the pinion and the shanks 38 of each blade as well as with the gear teeth 50 carried by the sector mounted upon each shank. Since the movement of the blades 34 is limited to rotation of the shank relative to the disc, the meshing of the pinion 54 and gear teeth of the sectors 50 will result in rotation between the blade and disc and the pitch change will thus be accomplished. Pitch change in the reverse direction is accomplished by imposition of a pressure differential across the actuating piston 102 within the cylinder 100 in the opposite direction, each of the above-described motions being reversed.

Depending upon the blade configuration, the actuator can be utilized to change pitch between predetermined angular orientations up to and including reverse pitch, wherein rotation of the disc 30 actually pumps air through the fan from the aft to the forward direction. This type operation would permit the elimination from the associated engine of the common thrust reversers utilized in present technology to accomplish air speed velocity reduction upon landing the aircraft to supplement the action of the wheel brakes. The fan blades are actuatable by means of the present actuating device into an infinite number of pitch positions dependent upon the axial positioning of the piston 102 within cylinder 100. This latter characteristic is true whether the reverse pitch capability is designed into the system or not; for the reverse pitch requires only a redesign of the blade airfoil and provision of a sufficient stroke of the piston 102 within the cylinder to accomplish forward rotation into the reverse pitch mode.

Position Sensor

Due to the extremely broad flexibility of the variable pitch actuator and its ability to dispose the fan blades in an infinite number of pitch positions, the present invention provides the very desirable characteristic of a means for dtermining the pitch position at any given time. This information can be utilized to indicate pitch position to the pilot of the aircraft or alternatively as an input to a control system responsible for engine power management or other variable parameters of the engine.

The pitch position sensor of the present invention comprises a variable output signal means for producing a detectable signal as a function of the axial position of the piston 102 within the cylinder 100. Since the position of the piston within the cylinder determines, by rotation of the casing 76, the amount by which the blade shank 38 of each blade is rotated, likewise it determines the pitch position of the blade. Means or "reading" the position of the piston will therefore indicate the pitch position.

More particularly, and referring now to FIGS. 3 and 5, the position sensor of the present invention includes a signal generating means cooperating with a fixed member of the pitch changing actuator, for example, with the disc 30, and means cooperating with the piston 102 for varying the signal output by the signal generator. For example, the signal generator in the present embodiment comprises a cylindrical hollow body 120 having a generally central aperture 122 extending therethrough and a mounting flange 124 for connecting one end of the cylinder to the disc or another fixed element of the mechanism. The signal varying means comprises a rod 126 which projects into the aperture 122 of the cylinder 120 and is movable axially therein between positions representing different output signals and corresponding to different pitch angles of the fan blades.

Reciprocation of the rod 126 within the cylinder 120 is accomplished during the pitch change cycle by cooperation of the rod with the piston 102. This cooperation is achieved by the disposition of an enlarged hooked end portion 128 of the rod within a detent or notch 130 of the piston. The hooked end 128 is retained within the detent by cooperation between the piston and shaft 60; and thus, as the piston moves fore or aft in response to pressure changes within the cylinder 100, the piston carries with it the end of the rod and therefore the rod itself.

The cylinder and rod combination can comprise a winding or coil, shown in simplified cross section as 132, and a movable core, with the core pentrating the coil to produce variable voltages. Such a device is disclosed with particularity in U.S. Pat. No. 3,140,475 by W. R. Spencer et al, issued July 7, 1964 to the same assignee as the instant case. The invention disclosed in that patent relates to an electromagnetic position transducer comprising a single primary coil and a single secondary coil connected in autotransformer fashion, the arrangement being such that voltage induced in the secondary coil "bucks" that opposed across the primary, and a readout device senses the difference of these opposed voltages to provide a measure of core position.

In lieu of that particular device, a similar devices may be utilized which generate a variable signal as a result of the position of a movable member. Cooperation between the movable member and the actuating piston 102, in some fashion, will generate the desired position indicating signal.

In order to enhance the reliability of the position indicator of the present invention, association of plurality of these indicators about the circumference of shaft 60 and in cooperation with the actuating piston 102 at various peripheral locations will provide fail-safe redundant signals to enhance reliability in the event of failure of one of more of the individual signal output mechanisms.

Pitch Lock

Another need recognized by the present invention is that for a reliable pitch lock mechanism which serves to retain the fan blades in the particular pitch position selected and to which the blades have been moved by action of the actuator piston 102. In other words, what is needed is a means for securing the position of the fan blades after pitch variation has taken place and maintaining the blades in this secured position until the control next determines that a pitch change is warranted.

In addition, it is desirable that the pitch lock be of such a fashion that, should the pitch varying mechanism fail, the pitch of the fan blades would be locked in its present safe position rather than being free to feather or to flap in the incoming airstream. The present invention recognizes these characteristics and desirable features and provides extremely simple and efficient inventive concepts for providing them.

Referring again to FIGS. 3 and 5, an enlarged view of a portion of the pitch change actuator is depicted. More particularly, a thrust collar 140 is shown disposed within a space between the casing 76 and a portion of a shaft 60. The collar circumscribes the shaft and is generally annular in configuration and includes an axially extending shoulder 142 which extends aft of the main collar portion. At the aft extremity of this shoulder are a plurality of teeth 144 in circumferentially spaced disposition about the shoulder and facing aftward. The purpose of these teeth will become apparent hereinafter.

In order to secure the thrust collar against relative rotational motion with respect to the shaft 60, a splined cooperation depicted at 146 is disposed between the shaft 60 and the collar. Furthermore, the thrust collar is restrained against axial movement with respect to the shaft, as well as with respect to the casing 76, by a pair of opposed thrust absorbing roller bearings 148 and 150 disposed in cooperation with opposite sides of the thrust collar. As a result of this configuration, during the pitch change operation when relative rotation occurs between shaft 60 and casing 76, the spline 146 carries the collar with the shaft and the roller bearings 148 and 150 permit relative rotation between the collar and casing while maintaining the collar in a predetermined axial position with respect to both the casing and shaft.

Further elements of the pitch lock include a locking piston 152, which is disposed within cylinder 100 along with the actuating piston 102. As a result, pressure differentials introduced across the actuating piston 102 may also be introduced across the locking piston 152. (It is not necessary for the proper functioning of the present invention that the two pistons be disposed within the same cylinder; an equally effective configuration would involve the disposition of the respective pistons within interconnecting cylinders.)

The locking piston 152 includes a generally annular body, which extends about a portion of the shaft 60, and an upstream extending projection 154 which terminates in a plurality of teeth 156 spaced circumferentially about the upstream directed face of the projection 154. These teeth are defined and spaced so as to be engageable and interlockable with the teeth 144 of the thrust collar 140. The locking piston 152 is dimensioned so as to be axially movable relative to the shaft 60 as well as the casing 76. However, a spline cooperation at 158 between the locking piston and the casing 76 precludes relative circumferential motion or rotational motion between the piston and the casing.

Axial translation of the locking piston 152 within the cylinder 100 is initiated by the imposition of a pressure differential across the locking piston by means of supplying high pressure fluid to one portion of the cylinder, for example that designated 110. This action tends to move the pitch lock piston aftward (that is, to the right in the FIGURE). This action is counteracted by a retaining means comprising a spring bias provided by a plurality of belleville springs 160 disposed between the aft end of the locking piston 162 and an opposed shoulder 164 within the casing 76.

In brief summary then, the thrust collar 140 is fixed axially with respect to both the casing 76 and the shaft 60 and is rotatable circumferentially relative to the casing 76 but fixed circumferentially relative to the shaft 60. Contemporaneously, the locking piston 152 is axially translatable with respect to the shaft and casing and is rotatable circumferentially relative to the shaft but fixed circumferentially relative to the casing. As a result, an interlock established between the piston and the thrust collar would result in the shaft 60 and casing 76 being locked against circumferential motion relative to one another.

Briefly, in absence of an appropriate pressure differential across the locking piston 152, the locking teeth 144 of the thrust collar and 156 of the locking piston are held in engaging and interlocking contact due to the spring bias provided by the belleville springs 160. In this situation, the shaft 60 and casing 76 are locked against relative rotational circumferential motion. Thus, it can be seen that the springs 160 provide an engaging bias between the locking teeth 144 and 156. To complement this, the present invention further provides a release means for providing a disengaging pressure differential across the locking piston to move the locking piston against the springs and disengage the teeth 156 from teeth 144, whereupon relative rotational motion between the shaft 60 and casing 76 is no longer prevented.

Of particular benefit, with respect to the simplicity and efficiency of operation of the pitch lock of the current invention, the means for operating the locking piston 152 incorporates elements in common with the means for operating the actuating piston 102. More particularly, since both pistons are disposed within the cylinder 100 and define the axial boundaries of the cylinder portion 110, the imposition of high pressure fluid into area 110 or the evacuation of fluid from area 110 will serve to induce a pressure differential across both pistons simultaneously and in the opposite directions. In order to vary the pitch of the fan, a pressure differential is induced across piston 102 for the purpose of translating the sleeve 66 and rotating the casing 76 with respect to the shaft 60, as described hereinabove. At precisely the same time, the imposition of a sufficient pressure differential across piston 152 serves to release the pitch lock by disengaging teeth 144 from teeth 156 by moving the locking piston 152 against the biasing springs 160. The locking teeth 144 and 156 are dimensioned, along with the spring constant of the biasing springs 160, in order to permit release of the locking teeth at a predetermined minimum pressure below that required to vary the pitch of the fan by moving the piston 102.

In operation, a pressurized fluid is provided to the area 110 of the cylinder 100, which fluid creates a pressure differential across the pitch lock piston 152 to drive the piston against springs 160 and release the engagement of teeth 144 and 156. Contemporaneously, the fluid drives actuator piston 102 forward within the cylinder to achieve pitch change as described hereinabove. Upon reaching the desired pitch, the pressure is reduced within area 110 of the piston so that the locking piston 152, impelled by springs 160, returns to locking engagement with the teeth of the thrust collar 140. Thereafter, the pitch remains constant and locked in this position until a new pressure differential is provided to the system for repeating this process.

As a further benefit of the pitch lock of the present invention, it can be appreciated that in the event of a hydraulic pressure failure within the cylinder, the springs 160 bias the locking piston 152 into an engaging contact with thrust collar 140 so that the device is fail-safe. That is, loss of pressure will result in the fan blades 36 being retained in the pitch position corresponding to the most recent pitch change. This is much preferred to possible configurations wherein loss of pressure would result in the pitch of the blades being totally uncontrolled.

Redundant Seals

To enhance the reliability of the hydraulic embodiment of the present invention described thus far, (as opposed to mechanical variations thereof which will be apparent to those skilled in the art), the present invention offers a fail-safe hydraulic sealing system for providing and maintaining the hydraulic pressure necessary to operate the various fluid operated mechanisms. Stated briefly, the sealing system provides primary and secondary seals at each junction between elements subjected to fluid pressure, the primary seals disposed proximate the junction and fluid pressure and the secondary seals disposed in series with the primary and spaced from the fluid pressure by a predetermined distance. Between the primary and secondary seals are disposed drain or leak-off lines to return fluid which might leak past the primary seal to a sump.

More particularly, one example of the redundant sealing system of the present invention can be appreciated by reference to FIG. 3, and particularly the seals toward the fore end of the shaft and casing arrangement defining cylinder 100. Shoulder 94 at the fore end of the casing 76 has already been introduced as abutting a portion of the shaft 60, designated 170, in FIG. 3. Due to the necessity of relative circumferential motion between these two elements, it is not possible to form them as a single, integral unit; and, hence, seal means must be provided therebetween for maintaining the fluid pressure within cylinder 100 against leakage.

For this purpose, a primary seal 172 is provided between the shoulder 90 and shaft surface 170 and near the interior of the cylinder — that is, proximate to the pressure source. Furthermore, according to the present invention, a secondary seal 174 is disposed between the shoulder and shaft surface at a position more remote from the cylinder interior than is the primary seal. Each of the seals can be in the form of a packing or O-ring or other similar sealing member appropriate for utilization. In this embodiment, the seals are continuous and annular, but the concepts hereof apply likewise to noncontinuous seals.

Referring now to FIG. 2, a perspective view of these elements is available wherein the casing 76 may be seen to function as a sheath defining the exterior of the cylinder, while the leading end thereof 94 can be considered a closure further defining the cylinder. The surface 170 of the shaft 60 in this depiction can be considered an inner sheath completing the definition of the cylinder 100.

Disposed between the primary and secondary seals 172 and 174, respectively, is a fluid accumulating groove 180 which extends circumferentially about the junction between the sheaths and closure and will serve to receive fluid escaping past the primary seal. The groove 180 is connected to a drain line 182 which returns the hydraulic fluid to a sink, such as that designated 184. The sink 184 is maintained at a pressure substantially lower than the pressure within the cylinder 100; and so the pressure drop across the primary seal is substantially greater than the pressure drop against the secondary seal. The net result is that, even though some fluid might leak past the primary seals, the chance of leakage beyond the secondary seals is made substantially remote by application of the present invention.

In operation, the hydraulic system of the present invention transfers hydraulic fluid from a sump to the cylinder 100 by means of appropriate fluid lines such as that designated 190 in FIG. 3. The fluid passing through line 190 is pressurized substantially above atmospheric pressure, and upon being directed into the cylinder pressurizes the cylinder to a similar level. Since, as has been stated, a large pressure drop exists across primary seal 172, there is a tendency for leakage thereacross. This tendency is enhanced by rotation of the closure 94 about the inner sheath 170 during the pitch change operation, wherein the casing 76 rotates relative to shaft 60. Assuming a small quantity of hydraulic fluid should manage to leak past primary seal 172, it is accumulated within groove 180 and from there returned to sink 184 by way of drain line 182 and connecting fluid lines, such as line 194 and others, not shown.

The hydraulic fluid collected within sink 184 can be returned to the hydraulic system by appropriately pumping it back up to the pressure utilized within that system or can be used as low pressure cooling or lubricating fluid in other portions of the engine as desired. At any rate, the fluid thus collected is prevented from escaping the hydraulic system and creating fire hazards or potential fluid buildups in undesired positions.

It is also apparent from the FIGURES that similar primary and secondary seals are disposed between other relatively movable fan elements for maintaining the hydraulic fluid therebetween. Additionally, second drain lines, similar to the drain lines such as 182 and collecting grooves 180, are disposed between the primary and secondary seals in these various positions. Briefly, one example which is depicted is the primary and secondary seals 200 and 202, respectively, between another junction of the casing 76 and shaft 60 as depicted particularly in FIG. 3. These seals cooperate with grooves and lines in substantially the same manner as the foregoing, and serve to deliver hydraulic fluid by way of drain lines such as line 194 already introduced to the sink 184.

Temperature Differential Control

One problem associated with the use of hydraulics in aircraft engines is that the environmental conditions pertaining to the operation of these engines includes radical temperature changes. Since these changes are often very rapid, there is the possibility that portions of the hydraulic system disposed closest to the environment will change in temperature relative to portions of the hydraulics disposed more remote from the environment. For example, a sump feeding hydraulic fluid to the cylinder 100 to side 110 of the piston 102 might conceivably deliver its fluid at a substantially different temperature than the fluid disposed to the opposite side, 112 of the piston. Were not compensation to be made for this phenomenon, there could be inaccurate operation of the pitch change device as a result.

The present invention provides means for overcoming this adverse characteristic, which means are depicted and described particularly with reference to the piston 102 but which apply equally to similar areas subjected to temperature differentials. In FIG. 3, the piston 102 is shown to include, near its lowermost portion (that depicted at the bottom of the Figure), a bleed orifice 210 which provides communication between sides 110 and 112 of the cylinder in order to pass a predetermined flow of hydraulic fluid therebetween to reduce the fluid temperature differential between these cylinder portions. As a result, the accurate operation of the piston driven variable pitch actuator is enhanced.

The flow through the bleed orifice, between the cylinder portions, can be constantly adjusted and controlled or can be left uncontrolled at a predetermined rate by means of proper definition of the orifice size. If a constant flow is selected, it will be necessary to provide means, such as a continuously operable pump, to maintain fluid pressure at its predetermined value within the high pressure side of the cylinder to prevent loss of pressure differential by way of the passage of fluid through the bleed orifice. Additionally, it would be necessary to provide a continuous exhaust of fluid at the same rate from the low pressure side of the cylinder for this same reason. Subject to these variations, the temperature differential across the piston can be rendered harmless with respect to actuator operation.

While the simplest form of the bleed orifice 210 is an aperture and passage through the piston at thus described, it is equally plausible to provide such an orifice which penetrates the cylinder defining walls rather than the piston and communicates the two cylinder portions. Such a variation would be apparent to one skilled in the art.

SUMMARY

The present invention thus contemplates a uniquely effective and simple pitch changing actuator for use with variable pitch turbofan engines. several unique additional characteristics have been provided to enhance the reliability and safety of operation of this fan. In addition to the basic actuator, means have been provided for locking the fan pitch between pitch changes, as well as in the event of actuator operation failure. Other means have been provided for sensing the pitch position at any given instant and for providing this information to an appropriate overseeing entity. Additional means have been provided, by the invention, for increasing the reliability of a hydraulic form of the actuator, thus presented, by assuring reliable retention of the hydraulic fluid within the device. Finally, means have been provided for compensating for the rugged environment within which turbofan engines are forced to operate, in order to increase accuracy of operation and reliability of the hydraulic form of this actuator.

While the present invention has been described with particular reference to a single embodiment thereof, those skilled in the art might substantially depart from the physical characteristics thus described without departing from the inventive concepts which underlie the present invention. Examples of such variations have been interspersed among the various portions of the description hereof. Further examples will be apparent to the reader as well as to the skilled fabricator uitlizing this advance in the art.

What is claimed as new and desired to be secured by Letters Patent of the United States is:

1. In a turbofan engine of the variety including an annular fan duct, a core engine disposed internally of the fan duct and comprising a compressor, a combustion chamber and a turbine, a variable pitch fan comprising:
   a fan disc, generally circular in peripheral shape, rotatable about its longitudinal axis and having a plurality of apertures in its periphery;
   a fan blade disposed within said duct and including a shank adapted to penetrate one of said apertures;
   bearing means interconnecting said shank and said one aperture and permitting relative rotation therebetween; and
   pitch varying means for rotating said shank including:
   a shaft coaxial and rotatable with said disc, the shaft secured in a predetermined relationship with the disc;
   a sleeve located radially outward of and telescopically receiving the shaft, the sleeve being axially translatable with respect to the shaft;
   a casing located radially outward of the sleeve, and telescopically receiving the shaft and the sleeve, the casing being rotatable about the shaft;
   first means carried by the casing for rotating said blade shank in response to rotation of the casing about the shaft;
   second means cooperating with the sleeve for causing translation of the sleeve in response to a predetermined signal;
   first recirculating ball spline means disposed between the shaft and the sleeve at a predetermined first helix angle for permitting said sleeve translation; and
   second recirculating ball spline means disposed between the sleeve and the casing at a predetermined second helix angle for rotating said casing in response to translation of said sleeve.

2. The fan of claim 1 wherein said first means includes a pinion carried by the casing and a gear carried by the shank.

3. The fan of claim 1 wherein said second means includes a cylinder, an actuating piston cooperating with the sleeve and disposed within the cylinder and third means for providing a pressure differential across the actuating piston to displace it within the cylinder.

4. The fan of claim 1 wherein said first and second helix angles are of opposite sense.

5. The variable pitch fan of claim 1 further incuding a pitch lock comprising:
   a thrust collar cooperating with said shaft,;
   a locking piston cooperating with said casing;
   first locking means associated with said collar;
   second locking means associated with said piston;
   retaining means for providing engagement between said first and second locking means; and
   release means for releasing said first and second locking means.

6. The pitch lock of claim 5 wherein:
   said thrust collar is fixed circumferentially with respect to said shaft; and said locking piston is fixed circumferentially with respect to said casing.

7. The pitch lock of claim 6 wherein:
said locking piston is axially movable with respect to said casing.

8. The pitch lock of claim 7 wherein said retaining means comprises spring means providing an engaging bias between said first and second locking means; and said release means includes means for providing a disengaging pressure differential across said locking piston.

9. The pitch lock of claim 8 wherein said first and second locking means include corresponding teeth carried respectively by said thrust collar and said locking piston.

10. The pitch lock of claim 11 wherein said locking piston is movable against said spring means responsive to a pressure differential imposed thereacross between a first position wherein said teeth are engaged and a second position wherein said teeth are disengaged.

11. The pitch lock of claim 8 wherein said second means includes a cylinder, an actuating piston secured with respect to the sleeve and disposed within the cylinder, and third means for providing a pressure differential across the actuating piston to displace it within the cylinder; and wherein
said third means also provides said disengaging pressure differential across said locking piston.

12. The pitch lock of claim 11 wherein said locking piston is disposed within said cylinder.

13. The pitch lock of claim 11 wherein said spring means biases said locking piston toward a position in which said first and second locking means are in a locking engagement; and failure of the third means to provide a pressure differential across said locking piston results in said pitch locked engagement.

* * * * *